United States Patent
Tan

(10) Patent No.: US 9,573,764 B2
(45) Date of Patent: Feb. 21, 2017

(54) COMPRESSION CONVEYING MECHANISM FOR BAGGED SPRING PRODUCTION

(71) Applicant: GUANGZHOU LIANROU MACHINERY & EQUIPMENT CO., LTD., Guangzhou Guangadong (CN)

(72) Inventor: Zhiming Tan, Guangzhou (CN)

(73) Assignee: Guangzhou Lianrou Machinery & Equipment Co., Ltd., Guangdong (CN)

( * ) Notice: Subject to any disclaimer, the term of this patent is extended or adjusted under 35 U.S.C. 154(b) by 0 days.

(21) Appl. No.: 15/031,460

(22) PCT Filed: Jun. 20, 2014

(86) PCT No.: PCT/CN2014/080360
§ 371 (c)(1),
(2) Date: Apr. 22, 2016

(87) PCT Pub. No.: WO2015/131465
PCT Pub. Date: Sep. 11, 2015

(65) Prior Publication Data
US 2016/0251161 A1   Sep. 1, 2016

(30) Foreign Application Priority Data

Mar. 5, 2014   (CN) .......................... 2014 1 0079173

(51) Int. Cl.
*B65G 15/14*   (2006.01)
*B65G 15/58*   (2006.01)
(Continued)

(52) U.S. Cl.
CPC .............. *B65G 15/14* (2013.01); *B65B 25/00* (2013.01); *B65B 63/026* (2013.01); *B65G 15/58* (2013.01);
(Continued)

(58) Field of Classification Search
CPC .... B65G 15/14; B65G 15/16; B65G 21/2054; B65G 21/2045
(Continued)

(56) References Cited

U.S. PATENT DOCUMENTS

| | | |
|---|---|---|
| 1,569,159 A | 1/1926 | Orman |
| 2,960,023 A | 11/1960 | Grenier et al. |

(Continued)

FOREIGN PATENT DOCUMENTS

| | | |
|---|---|---|
| CN | 203740239 U | 7/2014 |
| DE | 202005010696 U1 | 12/2006 |

*Primary Examiner* — James R Bidwell
(74) *Attorney, Agent, or Firm* — Hayes Soloway PC

(57) ABSTRACT

Disclosed is a compression conveying mechanism for bagged spring production. The mechanism comprises a machine frame (10), a spring conveying mechanism (20), and a spring compression conveying mechanism (30). The spring compression conveying mechanism (30) comprises two baffles (31) disposed on the machine frame and conveying belts (32) wound on the outsides of the baffles (31), The spring conveying mechanism (20) conveys a spring to a position so that the spring can be moved from the end where the distance between the two baffles (31) is larger to the other end where the distance between the two baffles (31) is small. And after the spring is compressed to a certain degree, the spring is disengaged from the spring conveying mechanism (20) and is conveyed by the spring compression conveying mechanism (30). By compression and conveying of a spring being integrated, the degree of automation is high.

6 Claims, 2 Drawing Sheets

(51) Int. Cl.
*B65B 25/00* (2006.01)
*B65B 63/02* (2006.01)
*B65G 17/12* (2006.01)
*B65G 17/46* (2006.01)
*B65G 37/00* (2006.01)
*B65B 35/24* (2006.01)

(52) U.S. Cl.
CPC .............. *B65G 17/12* (2013.01); *B65G 17/46* (2013.01); *B65G 37/00* (2013.01); *B65B 35/243* (2013.01)

(58) Field of Classification Search
USPC .......... 198/604, 606, 612, 613, 626.1, 626.5
See application file for complete search history.

(56) References Cited

U.S. PATENT DOCUMENTS

| | | | | |
|---|---|---|---|---|
| 4,756,957 | A * | 7/1988 | Kielmeyer | E04B 1/7658 156/167 |
| 5,079,982 | A * | 1/1992 | Antonissen | B26D 7/0625 198/626.5 |
| 5,868,240 | A * | 2/1999 | Knoepfel | B21F 33/04 198/405 |
| 5,950,473 | A * | 9/1999 | Andrea | B21F 33/04 140/3 CA |
| 6,119,322 | A * | 9/2000 | Eto | B21F 33/04 29/33 E |
| 2004/0020169 | A1 | 2/2004 | Haasl | |
| 2009/0266032 | A1 * | 10/2009 | Spinks | B68G 9/00 53/438 |

* cited by examiner

COMPRESSION CONVEYING MECHANISM FOR BAGGED SPRING PRODUCTION

FIELD OF THE INVENTION

The present invention relates to the technical field of bagged spring production devices, and more particularly, to a compression conveying mechanism for a bagged spring production machine.

BACKGROUND OF THE INVENTION

A bagged spring production machine is used for gradually packaging single independent spring into a cloth bag. At present, in the bagged spring production machine, it is desirable to specially design a spring feed mechanism and a spring compression mechanism to flatten the spring, and then the flattened spring is pushed into the cloth bag for packaging, wherein the present bagged spring production machine has the defects of complicated entire structural design, huge volume, instable conveying and low efficiency, and is difficult to satisfy the requirements of automation and large-scale mass production.

SUMMARY OF THE INVENTION

A technical problem to be solved by the present invention is to provide a compression conveying mechanism for bagged spring production which is simple in structure, high in production efficiency and runs stably.

To solve the foregoing technical problem, the present invention employs a technical solution as follows: a compression conveying mechanism for bagged spring production includes a machine frame, a spring conveying mechanism and a spring compression conveying mechanism. The spring compression conveying mechanism bears a spring conveyed by the spring conveying mechanism and compresses the spring, the spring compression conveying mechanism includes two baffles disposed on the machine frame and conveying belts wound on the outsides of the baffles, and the distance between the two baffles is gradually decreased from one end to the other end. The spring conveying mechanism conveys the spring to a position between the two baffles and drives the spring to move from the end where the distance between the two baffles is large to the other end where the distance between the two baffles is small. The spring is gradually compressed in the horizontal moving process along with the gradually decreased distance between the two baffles, and after the spring is compressed to a certain degree, the spring is disengaged from the spring conveying mechanism and is conveyed by the spring compression conveying mechanism.

As a further improvement on the technical solution of the present invention, the spring conveying mechanism includes a conveying belt body and a driving mechanism driving the conveying belt body to run. The conveying belt body is provided with a straight segment between the two baffles, and a plurality of magnetic suction blocks which suck the spring with a magnetic force are arranged on the conveying belt body in a spacing manner. The conveying belt body runs to make the spring in the straight segment and sucked by the magnetic suction blocks moved and compressed between the two baffles; after the spring is compressed to a certain degree, the conveying belts outside the two baffles produce a frictional force to the spring which is greater than the suction force of the magnetic suction blocks on the spring, so that the spring is disengaged from the magnetic suction blocks and is clamped and conveyed by the conveying belt body outside the two baffles. As a further improvement on the technical solution of the present invention, the present invention further includes a spring coiling mechanism which winds a steel wire into a spring, wherein when the conveying belt body runs to make the magnetic suction blocks move to the spring coiling mechanism, the magnetic suction blocks suck the spring produced by the spring coiling mechanism under the action of the magnetic force.

As a further improvement on the technical solution of the present invention, an included angle formed between the two baffles is adjustable.

Advantageous Effects

The compression conveying mechanism for bagged spring production mainly automatically compresses the spring produced by the spring coiling mechanism and conveys the spring to a subsequent working procedure to package the spring in a cloth bag; by providing the spring conveying mechanism and the spring compression conveying mechanism, after the spring is conveyed between the two baffles by the spring conveying mechanism, the spring moves from the end where the distance between the two baffles is large to the other end where the distance between the two baffles is small; with the gradually decreased distance between the two baffles, the two ends of the spring are gradually squeezed by the conveying belts outside the two baffles and thus compressed, after the spring is compressed to a certain degree, the spring is disengaged from the spring conveying mechanism automatically and conveyed to the subsequent working procedure to package the spring in a cloth bag through the spring compression conveying mechanism, which abandons the structural form of a traditional bagged spring production machine, so that the present invention has the advantages of high automation degree, simple structure, high production efficiency, and more stable compression and conveying.

BRIEF DESCRIPTION OF THE DRAWINGS

The present invention will be further explained in details hereinafter with reference to the drawings and embodiments.

DETAILED DESCRIPTION OF THE EMBODIMENTS

Figure 1:
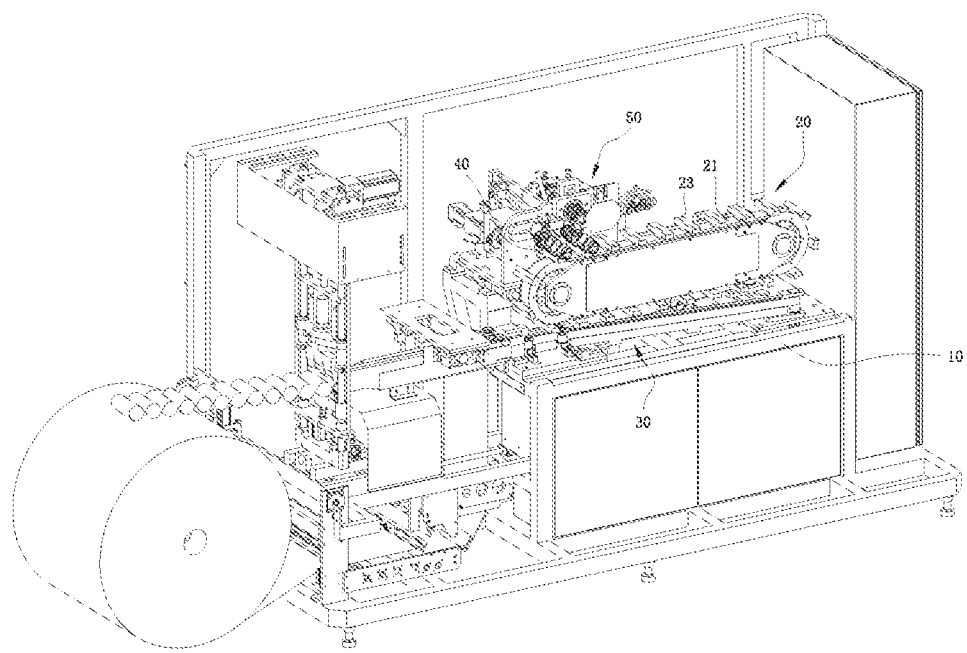
FIG. 1 is a structure diagram of embodiments of the present invention.
Figure 2:
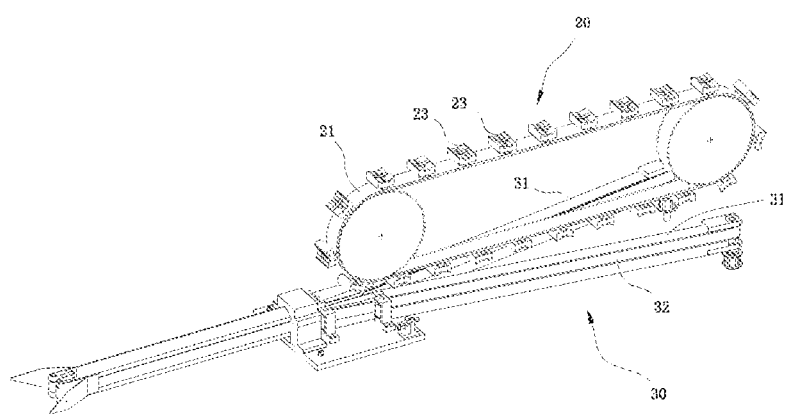
FIG. 2 is a partial structure diagram of embodiments of the present invention.

Referring to FIG. 1 and FIG. 2, a compression conveying mechanism for bagged spring production includes a machine frame 10, a spring conveying mechanism 20, and a spring compression conveying mechanism 30. The spring compression conveying mechanism 30 bears a spring 40 conveyed by the spring conveying mechanism 20 and compresses the spring, the spring compression conveying mechanism 30 includes two baffles 31 disposed on the machine frame 10 and conveying belts 32 wound on the outsides of the baffles 31, and the distance between the two baffles 31 is gradually decreased from one end to the other end. The spring conveying mechanism 20 conveys the spring 40 to a position between the two baffles 31 and drives the spring 40 to move so that the spring 40 can be moved from the end where the distance between the two baffles 31 is large to the other end where the distance between the two baffles 31 is small. The spring 40 is gradually compressed in the horizontal moving process along with the gradually decreased distance between the two baffles 31, and after the spring 40 is compressed to a certain degree, the spring is disengaged from the spring conveying mechanism 20 and is conveyed by the spring compression conveying mechanism 30.

The compression conveying mechanism for bagged spring production according to the present invention mainly automatically compresses and conveys the spring produced by the spring coiling mechanism so that the spring can be coated and packaged through a cloth bag packaging mechanism in a subsequent working procedure.

In the embodiment, the conveying and compression of the spring 40 are simultaneously implemented by the spring compression conveying mechanism 30, wherein the spring compression conveying mechanism 30 includes two baffles 31 and conveying belts respectively wound on the outsides of the baffles 31; the conveying belts 32 are vertically erected and drive the conveying belts 32 to run through a regular mechanical drive manner, the two baffles 31 form an included angle and are horizontally disposed on the machine frame 10, the two baffles 31 are spaced by a certain distance, and the distance between the two baffles 31 is gradually decreased from one end to the other, the two baffles are overlooked in a V shape, and the spring 40 enters from the end where the distance between the two baffles 31 is large and moves between the two baffles 31. Wherein, an included angle formed between the two baffles 31 is adjustable.

The spring conveying mechanism 20 includes a conveying belt body 21 and a driving mechanism driving the conveying belt body 21 to run, wherein the conveying belt body 21 is a regular conveying belt, while the drive manner thereof can be a regular mechanical drive manner such as chain drive, tape drive or the like, according to the actual situations. In the embodiment, the conveying belt body 21 is a tooth-form belt, and the conveying belt body 21 is disposed above the spring compression conveying mechanism. a plurality of magnetic suction blocks 23 having a magnetic force are continuously arranged on the conveying belt body 21 in a spacing manner, each magnetic suction block 23 can suck the spring 40 through the magnetic force, and when the conveying belt body 21 runs, each magnetic suction block 23 moves circularly along the conveying direction of the conveying belt body 21.

A spring coiling mechanism 50 is also arranged above the spring conveying mechanism 20, the spring coiling mechanism 50 winds a steel wire into a spring 40 and then delivers the spring. When the conveying belt body 21 runs to drive the magnetic suction blocks 23 to move to the spring coiling mechanism 50, the magnetic suction blocks suck the spring 40 conveyed by the spring coiling mechanism 50 under the action of the magnetic force, and the magnetic suction blocks 23 continuously move after sucking the spring 40.

The conveying belt body 21 is in an annular runway shape observed in horizontal, and is provided with a straight segment which is located between the two baffles 31 and is slightly higher than the two baffles 31. The front and tail ends of the straight segment are just located at the front and tail ends of the two baffles 31. When the magnetic suction blocks 23 pass by the spring coiling mechanism 50 and suck the spring 40, the magnetic suction blocks 23 sucking the spring 40 pass by the straight segment in sequence, and the sucked spring 40 moves horizontally between the two baffles 31, and moves from the end where the distance between the two baffles 31 is large to the other end where the distance between the two baffles 31 is small. The two ends of the spring 40 are gradually squeezed and compressed by the conveying belts 32 outside the two baffles 31 in the horizontal moving process along with the gradually decreased distance between the two baffles 31. When the spring 40 moves horizontally to the tail end and is ready to move upwards with the rotation of the magnetic suction blocks 23, the spring 40 is automatically disengaged from the magnetic suction blocks 23 and is clamped by the conveying belts 32 outside the two baffles 31 to continuously move forwards because a frictional force produced by the conveying belts 32 outside the two baffles 31 on the spring by squeezing is greater than the suction force of the magnetic suction blocks 23 on the spring 40, and then the conveying belts 32 clamp the spring 40 and convey the spring to a subsequent cloth bag packaging mechanism to package the spring in the cloth bag. The embodiments of the present invention are explained in details above with reference to the drawings, but the present invention is not limited to the foregoing embodiments only. Those having ordinary skills in the art, within the knowledge scope possessed thereof, may also figure out various modifications without departing from the objectives of the present invention.

The invention claimed is:

1. A compression conveying mechanism for bagged spring production, comprising a machine frame, a spring conveying mechanism, and a spring compression conveying mechanism, wherein the spring compression conveying mechanism bears a spring conveyed by the spring conveying mechanism and compresses the spring, the spring compression conveying mechanism comprises two baffles disposed on the machine frame and conveying belts wound on the outsides of the baffles, and the distance between the two baffles is gradually decreased from one end to the other end, the spring conveying mechanism conveys the spring to a position between the two baffles and drives the spring to move from the end where the distance between the two baffles is large to the other end where the distance between the two baffles is small, the spring is gradually compressed in a horizontal moving process along with the gradually decreased distance between the two baffles, and after the spring is compressed to a certain degree, the spring is disengaged from the spring conveying mechanism and is conveyed by the spring compression conveying mechanism.

2. The compression conveying mechanism for bagged spring production according to claim 1, wherein the spring conveying mechanism comprises a conveying belt body and a driving mechanism driving the conveying belt body to run, the conveying belt body is provided with a straight segment between the two baffles, a plurality of magnetic suction blocks which suck the spring with a magnetic force are arranged on the conveying belt body in a spaced manner, the conveying belt body runs to make the spring in the straight segment and sucked by the magnetic suction blocks moved and compressed between the two baffles; after the spring is compressed to a certain degree, the conveying belts outside the two baffles produce a frictional force to the spring which is greater than the suction force of the magnetic suction blocks on the spring, so that the spring is disengaged from the magnetic suction blocks and is clamped and conveyed by the conveying belt body outside the two baffles.

3. The compression conveying mechanism for bagged spring production according to claim 2, further comprising a spring coiling mechanism which winds a steel wire into a spring, wherein when the conveying belt body runs to make the magnetic suction blocks move to the spring coiling mechanism, the magnetic suction blocks suck the spring produced by the spring coiling mechanism under the action of the magnetic force.

4. The compression conveying mechanism for bagged spring production according to claim 1, wherein an included angle formed between the two baffles is adjustable.

5. The compression conveying mechanism for bagged spring production according to claim 2, wherein an included angle formed between the two baffles is adjustable.

6. The compression conveying mechanism for bagged spring production according to claim 3, wherein an included angle formed between the two baffles is adjustable.

\* \* \* \* \*